Aug. 11, 1970   S. C. BOTTOMLEY   3,523,736
METHOD OF AND MEANS FOR SURFACE MEASUREMENT
Filed June 8, 1967
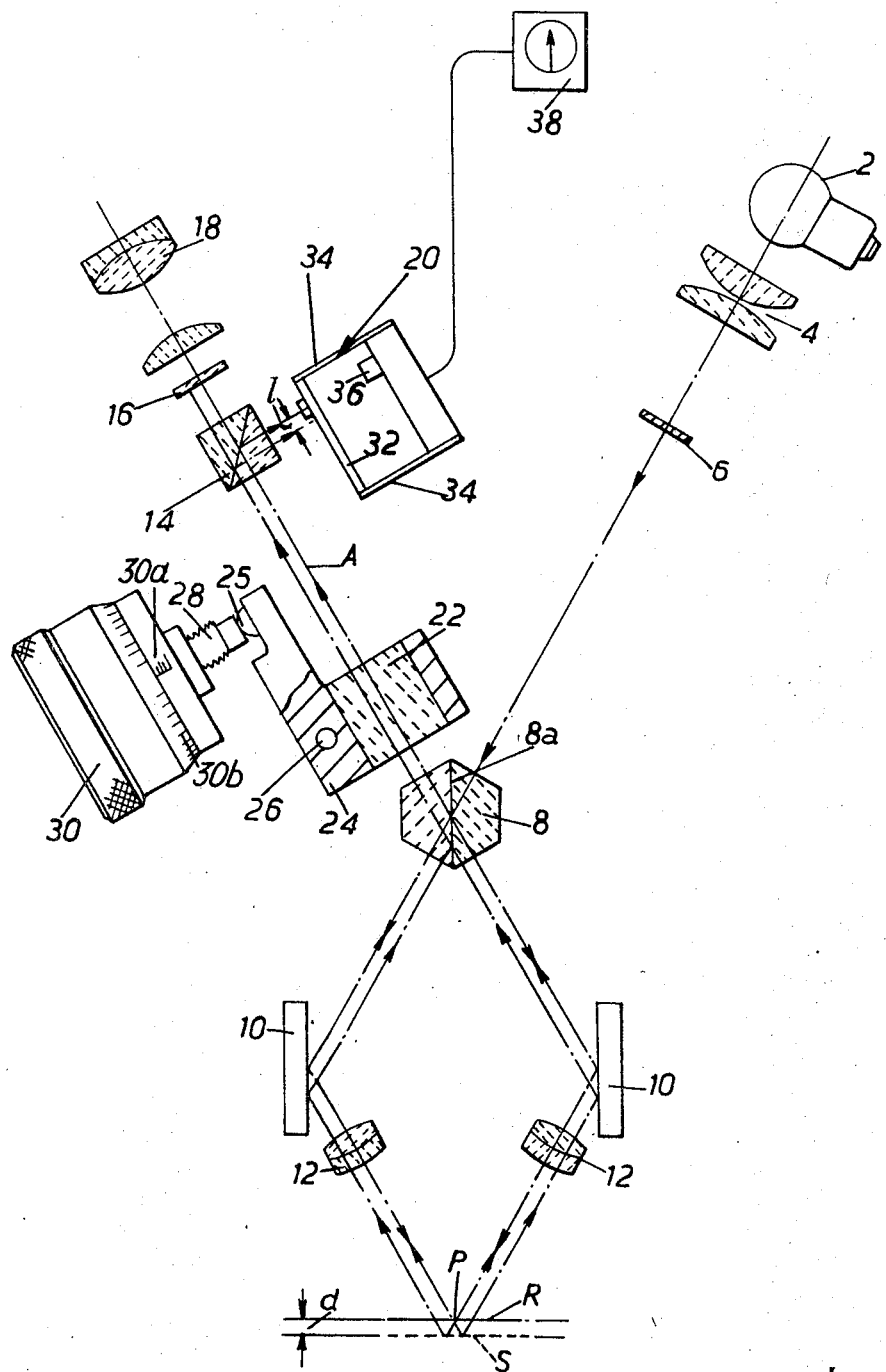
Inventor
Stafford Cyril Bottomley
BY Baldwin Wight Diller & Brown
Attorn

United States Patent Office 3,523,736
Patented Aug. 11, 1970

3,523,736
METHOD OF AND MEANS FOR SURFACE MEASUREMENT
Stafford Cyril Bottomley, Wallington, England, assignor to Hilger & Watts Limited, London, England, a company of Great Britain and Northern Ireland
Filed June 8, 1967, Ser. No. 644,720
Int. Cl. G01b *11/00*
U.S. Cl. 356—156     10 Claims

ABSTRACT OF THE DISCLOSURE

The specification describes a non-contacting measurement probe of optical form. An incident beam is split into two to follow paths oblique to a reflecting surface under test and the split beams are deflected through a cross-over point representing a datum adjacent to the surface under test. After reflection from the surface the split beams are directed along a common exit path and measurement of the surface distance from the datum is determined by the combined lateral displacement imposed on the split beams, while measurement of the surface obliquity is determined by the relative lateral displacement between the two split beams.

---

This invention relates to the non-contacting measurement of a reflecting surface, in particular, to the determination of the distance and/or the obliquity of the surface relative to some datum.

Precise surface location measurements are mainly made using means which require physical contact with the surface under examination. Typical equipment for such measurements are screw micrometers and dial gauges. An alternative known technique which avoids physical contact is that using pressure air gauges. This, however, usually requires a relatively elaborate setup that makes it suitable for quantity work such as automatic or semi-automatic production inspection.

There is therefore a need for a method of surface location measurement that can be more conveniently applied to small batches of articles and that offers a high accuracy of reading without requiring physical contact with the surface under test. This need has been accentuated more recently by the new use of delicate materials in such developments as micro-miniaturisation and the accuracy required for the location of components.

It is often found that the surfaces to be tested permit optical methods of measurement to be used. While the use of the depth of focus characteristic of a microscope is well known and can be employed, with suitable calibration of the instrument, to provide a measure of surface distance, operation of such an arrangement requires considerable skill and effort.

In the method according to the invention, a target image beam is divided by a beam splitter along two divergent paths and the split beams are deflected to a point of intersection at or adjacent the reflecting surface being measured, the reflected beams from said surface being returned to the beam splitter where illumination from both beams forms a combined measurement beam in an exit path from the beam splitter, the location of the target images of the split beam illumination patterns laterally to a reference axis of the combined beam being measured to provide an indication of the distance of said reflecting surface relative to a datum plane containing said point of intersection and/or the relative lateral spacing of said images being measured to indicate obliquity between said surface and said plane.

A device according to the invention for such measurement of a reflecting surface may comprise means for directing a target image beam through a beam splitter, respective parallel members arranged to deflect the emergent split beams towards a point of intersection in the datum plane at or adjacent the surface under measurement and to return the reflected beams from the surface to the beam splitter, there being provided indication means in an exit path from the beam splitter to receive illumination from both beams after their return by said deflection means to the beam splitter, said indication means being operable to measure the surface distance and/or inclination relative to the datum plane.

More particularly, by arranging the plane of reflection of the beam splitter parallel to the planes of respective mirrors forming the deflection means, as the split beams are returned through the beam splitter they form a combined exit beam in which the patterns of the target image are coincident only when the surface is perpendicular to the planes of reflection. Any obliquity of the surface results in a lateral spacing of the two images and the distance of the surface from the datum plane determines the mean lateral displacement of the two images. If the measurement to be taken is of the surface distance, the observed emergent illumination can therefore provide a check to ensure that the surface is aligned parallel to the datum plane.

One embodiment of the invention will be more particularly described with reference to the accompanying drawing which is a diagrammatic illustration of apparatus according to the invention.

Referring to the drawing, illumination from a lamp 2 is directed by condenser 4 through a graticule 6 carrying a target pattern, e.g. in the form of one or more lines, to a symmetrical double-prism beam splitter 8. The split beams emerge from the beam splitter to strike respective mirrors 10 located parallel to and equidistant from semi-reflecting surface 8a of the beam splitter. The mirrors 10 deflect the split beams towards each other and after passing through objectives 12 they intersect at point P lying in a reference plane R.

The optical system shown is symmetrical and if a reflecting surface is located in the plane P, the split beams will be reflected along each other's incident paths back to the beam splitter and illumination from each will be directed along exit path axis A to an observation region where a second beam splitter 14 allows part of the illumination to go through an eyepiece graticule 16 to objective 18 of an eyepiece for ocular observation but deflects some of the illumination to a photo-electric detector 20.

If the reflecting surface is spaced below the reference plane, e.g. if it is in a parallel plane S, the split beams are not reflected until they have passed beyond the point of intersection P and have begun to diverge from each other. Their return paths are therefore spaced laterally from the return paths described above. Moreover, in the exit beam the two reunited parts of the illumination will have been given similar lateral displacements to each other so that they form a single target image. It will be clear that this lateral displacement *l* of the exit beam from the axis A is directly proportional to the distance *d* between the planes R and S.

In the system described, the two parts of the reflected illumination leaving the beam splitter 8 along the exit path will always be co-incident when the reflecting surface is perpendicular to the semi-reflecting surface 8a of the beam splitter. It may be noted here that the same result is obtained when the mirrors 10 are not parallel to the surface 8a provided they are parallel to each other.

If the surface S is inclined relative to the plane R, it may be seen that the reflected split beams will return to a pair of spaced points on the semi-reflecting surface 8a and in the exit path the two reunited parts of the illumination will no longer be co-incident but will produce a pair of separate target images having their lateral spacing determined by the obliquity of the reflecting surface S. The mean lateral position of the two images relative to the axis A will of course continue to indicate the mean spacing of the surface from the reference plane R at the points of reflection of the split beams.

The illustrated apparatus is intended more particularly for measurements of depth or distance and is arranged for null-setting reading. Thus, in the exit beam path there is an optical refraction block 22 mounted by a lever 24 to a fixed pivot 26 about which it is rotated by screw 28 of a micrometer drum 30 bearing on ball-ended arm 25 of the lever 24. The micrometer drum has respective reading scales 30a 30b. In operation, the reflecting surface would be manipulated, if necessary, to ensure its parallelism to the reference plane R and the micrometer screw adjusted until the target graticule image appears co-incident with the eyepiece graticule pattern.

A fine setting may be derived from the photoelectric detector 20. This may comprise, in known manner, an apertured screen 32 mounted on parallel spring blades 34 to be vibrated transversely across the target image plane, a photo-sensitive element 36 receiving the resultant target image illumination passing through the screen. The element 36 thereby generates an A.C. signal, registered on meter 38, dependent upon the mean relative lateral location of the image to the apertured screen. By adjustment of the micrometer screw 28, the image position can be adjusted to give a null setting on the meter 38 and the resultant setting of the micrometer drum 30 then indicates the depth $d$.

A typical use of apparatus according to the invention is in the checking of standard end bars to a master; in doing this, an end face of the master is first used to provide the reference plane R for calibration of the instrument.

Since no contact is made with the article being measured, the method of the present invention is particularly suited for the measurement of the depth of a cavity or for checking the position of a membrane or film which might be damaged by a mechanical probe. The sensitivity of the method to angular orientation also makes it useful for such tasks as measuring the surface height or depth of convex or concave spherical surfaces and for determining the generating centers of such surfaces.

The adaptation of the illustrated apparatus to provide a quantitative measurement of the obliquity of a sample surface to the reference plane R will be sufficiently obvious from the foregoing description not to require further exemplification.

What I claim and desire to secure by Letters Patent is:

1. A method for the determination of at least one of several relations of a reflecting surface to a datum plane including the distance of the reflecting surface from the datum plane and the obliquity of a reflecting surface relative to a datum plane, said method comprising the steps of dividing a target image beam by a beam splitter along two divergent paths, deflecting the split beams to a point of intersection adjacent the reflecting surface being measured, returning the reflected beams from the reflecting surface to the beam splitter where the illumination from both beams form a combined measurement beam in an exit path from the beam splitter, measuring at least one image relationship selected from the relative location of the target images of the split beam illumination pattern laterally to a reference axis of the combined beam to provide an indication of said distance and the relative lateral spacing of said images being measured to determine said obliquity.

2. A method of distance measurement according to claim 1 together with the step of adjusting the reflecting surface relative to the incident illumination to cause the target images in the measurement beam to merge, thereby ensuring that obliquity is removed before the distance of the reflecting surface is measured.

3. A method of distance measurement according to claim 1 together with the step of applying a correcting lateral displacement to center said target images on the reference axis and obtaining a measure of the correction thereby applied to indicate the distance between the reflecting surface and the datum plane.

4. A method according to claim 1 wherein said method is utilized for comparing a length dimension of a plurality of objects, one of the objects forming a master and its length dimension being employed to provide said datum plane for measurement of the other object.

5. A method according to claim 1 wherein obliquity measurements are made upon a spherical reflecting surface to determine the generating center of the surface.

6. Apparatus for the selective determination of at least one of the distance and the obliquity of a reflecting surface relative to a datum plane said apparatus comprising, in combination, a beam splitter, source means for directing a target image beam through the beam splitter, respective parallel members beyond the beam splitter arranged to deflect the emergent split beam towards a point of intersection in the datum plane adjacent the surface under measurement and to return the reflected beams from the surface to the beam splitter, indication means in a return exit path from the beam splitter to receive illumination from both beams after their return by said deflecting members to the beam splitter, said indication means being operable to measure at least one of the surface distance and the inclination relative to the datum plane.

7. Apparatus according to claim 6 wherein said parallel members are a pair of mirrors and the plane of reflection of the beam splitter is parallel to the planes of reflection of said mirrors.

8. Apparatus according to claim 6 wherein a lateral displacement member is provided in said beam splitter exit path, said member being adjustable to displace the resultant target images to center on a reference axis in said path, means being provided to measure the adjustment of said member required for said displacement and thereby to indicate the distance between the reflecting surface and the datum plane.

9. Apparatus according to claim 6 further comprising an eyepiece and a photoelectric fine-reading arrangement and wherein a further beam splitter is arranged in the exit path to direct illumination both to the eyepiece for ocular obseravtion and to the photoelectric arrangement for a fine-reading setting.

10. Apparatus according to claim 6 wherein a lateral displacement member having calibration means to indipath, said member being adjustable to dispalce the resultant target images to center on a reference axis in said path, a further beam splitter being disposed beyond said displacement member and an eyepiece and a photoelectric fine-reading arrangement being located in the respective optical paths from said further beam splitter, said lateral displacement member having calibration means to indicate a measure of the adjustment applied to center said images, a null-setting indicator being provided in said photoelectric arrangement whereby the fine setting of said lateral displacement member for centering of said images may be determined.

References Cited

UNITED STATES PATENTS 3,118,069   1/1964   Guillant _____ 356—170

RONALD L. WIBERT, Primary Examiner

P. K. GODWIN, Jr., Assistant Examiner

U.S. Cl. X.R.

356—169, 170, 171, 172